April 5, 1966 H. J. ELINEAU 3,244,365
APPARATUS FOR SEPARATING AND COUNTING BARS
OR OTHER ROLLED PRODUCTS
Filed Nov. 20, 1964 2 Sheets-Sheet 1
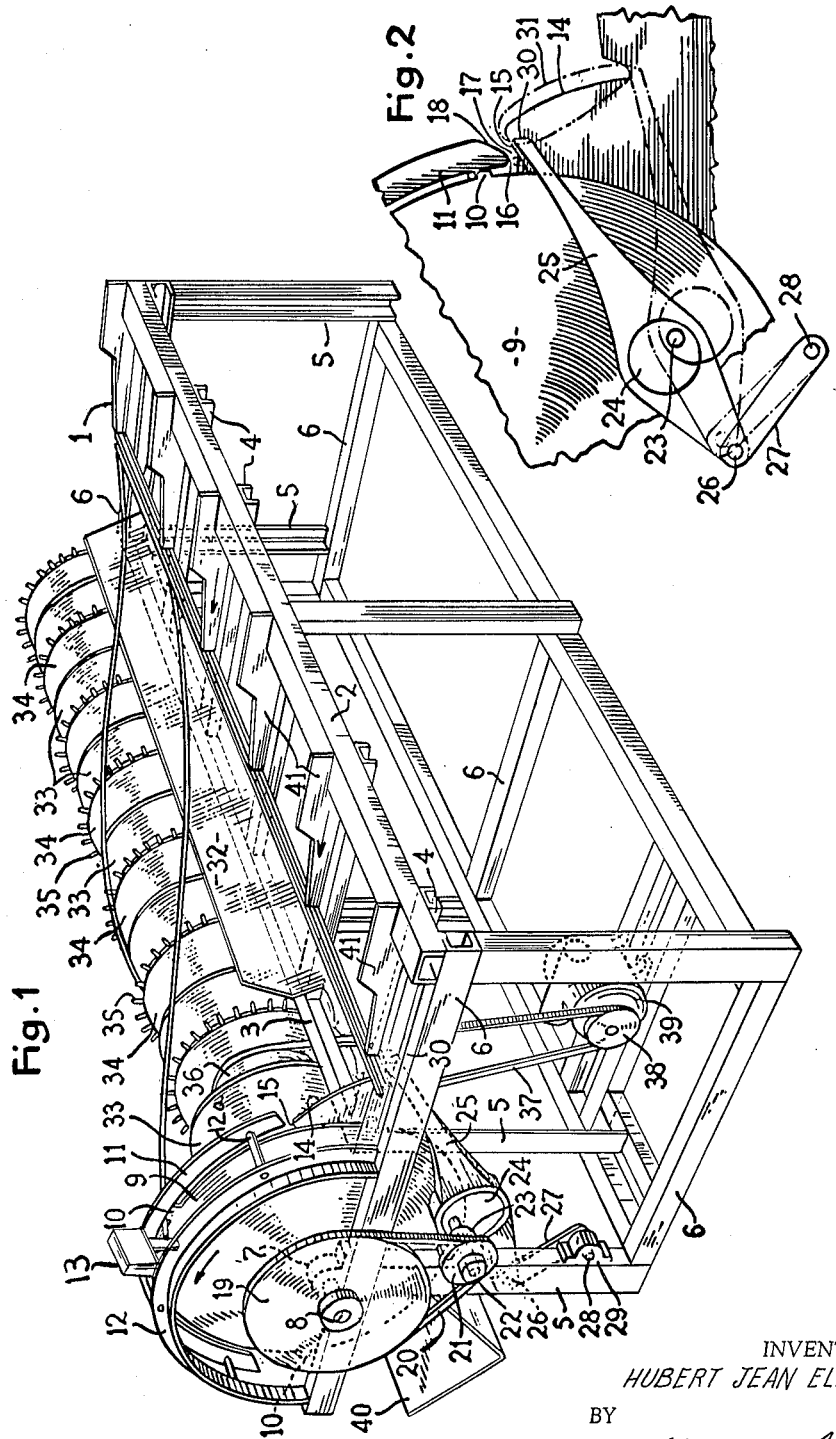
INVENTOR.
HUBERT JEAN ELINEAU
BY
HIS ATTORNEY

# United States Patent Office 3,244,365
Patented Apr. 5, 1966

3,244,365
APPARATUS FOR SEPARATING AND COUNTING BARS OR OTHER ROLLED PRODUCTS
Hubert Jean Elineau, Versailles, France, assignor to Societe pour l'Etude et la Construction d'Installations Metallurgiques, a corporation of France
Filed Nov. 20, 1964, Ser. No. 412,761
Claims priority, application France, Dec. 16, 1963, 957,284
6 Claims. (Cl. 235—98)

The present invention relates to an apparatus for separating and counting elongated workpieces, such as rolled billets, bars and the like.

The counting of such rolled or drawn metallic products is presently performed by hand and requires a substantial labor force, which is very time consuming and costly. Furthermore, the increased number of sizes and shapes in the products makes counting by mechanical means heretofore unfeasible.

The purpose of the present invention is to provide a fully automatic apparatus for separating and counting a large number of workpieces having variable lengths, sizes and shapes.

Also, an apparatus according to the invention can be employed to handle the accelerated production rates of the modern rolling mills and such an apparatus, through its precision and rapid operation, eliminates the difficulty and slowness of manual separation and counting.

An apparatus built according to the invention distinguishes itself, particularly in that it comprises a horizontal rotary shaft arranged parallel with the products to be counted, said shaft carrying at one of its ends a distributing device for transferring the products in a predetermined controlled fashion to a counting device where they are counted, and including means for feeding in a controlled fashion a designated number of products to the distributing device.

According to another feature of the invention, the distributing device comprises a rotary disk mounted on said shaft and having at its periphery at least one radial tooth to carrying the products one by one, a concave-shaped guide arranged above the disk and partly surrounding it and forming a passageway for the passage of products, and an approach ramp spaced from the end of the guide by an adjustable distance corresponding to the sectional dimensions of the products to be counted.

Other characteristics of the invention will become more evident in the course of the description of the invention that will now follow, wherein reference will be made to the attached drawings which are an exemplified embodiment of the present invention and in which:

FIGURE 1 is a general view in perspective over an apparatus, viewed from the side of the distributing device;

FIGURE 2 is an enlarged view of the distributing device, showing also the oscillating arm and the trajectory of its end.

Figure 3:
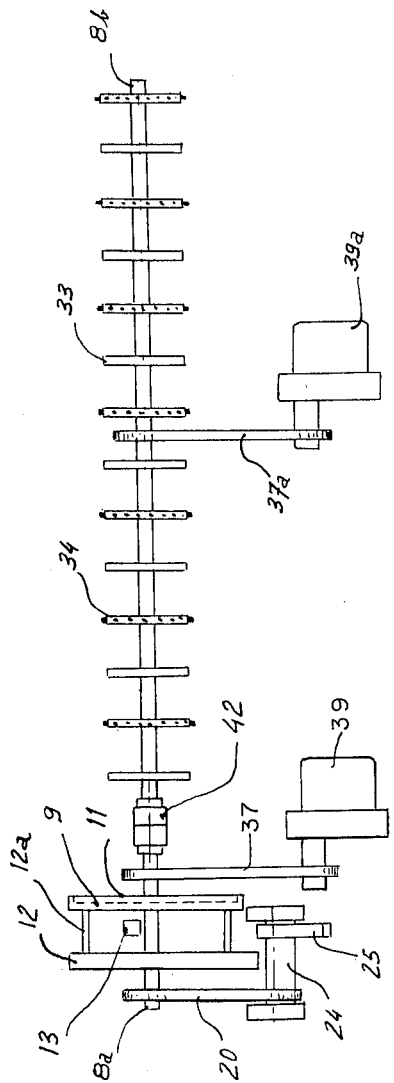
FIGURE 3 is a schematic plan view of a variation to the apparatus shown in FIGURE 1.

According to the illustrated embodiment of the present invention, there is provided a horizontal rectangular frame 1 made up of two longitudinal beams 2 and 3 joined together by cross-beams 4 which form part of an entry station for receiving a number of parallel arranged bars which are to be separated and counted. The frame 1 is supported by posts 5 joined at their lower ends by cross-pieces 6. It will be noted that the cross-pieces 6 are longer than the cross-beams 4 of the frame 1, whereby the structure carrying the frame extends past the frame at one side. The longitudinal beam 2 of the frame 1 forms one of the borders of the structure; as a result thereof the longitudinal beam 3 of the frame 1 is approximately in the center of the structure. Furthermore, this beam 3 is a little shorter in length than the beam 2 and, as seen by the front side of the structure in FIGURE 1, the upper cross-piece 6 of the structure and the first cross-beam 4 of the frame are parallel and spaced so as to form between them a rectangular opening transverse in relation to the longitudinal axis of the structure.

The framework at the end of each of the upper cross-pieces 6 opposite the longitudinal beam 2 carries bearings 7, only one of which is shown in FIGURE 1, in which is mounted a horizontal rotary shaft 8 arranged parallel to the longitudinal axis of the framework. This shaft 8, in the vicinity of its front end, carries a driving disk 9 arranged to turn in the rectangular opening formed in front of the framework between the upper cross-piece 6 and the first cross-beam 4 of the frame 1. The disk 9 has at its periphery radial teeth 10, only one of which is shown, which form a part of a device to distribute and separate the bars to be counted; hereafter in referring to the device it will be referred to as a distributing device.

In addition to the driving disk 9, the distributing device has two fixed members secured to the framework, as best shown in FIGURE 2. The first one of these members is a concave-shaped guide 11 secured to the framework by any appropriate means and partially encompasising the upper part of the disk 9 for a certain distance of its periphery. In the example illustrated, the guide 11 is supported by an arch 12, secured to the upper cross-piece 6, through stays 12a. A counting device 13 is secured to the guide 11 and arranged so as to be actuated by a bar being transferred by a tooth 10 of the distributing device. An example of such a counting device capable of being utilized in this environment is illustrated in General Controls Company's Catalog No. 608,462.

Referring now, particularly, to the guide 11 it will be noted that it terminates inside the framework at a certain distance above the frame 1 and, within this distance there is disposed a second fixed member of the distributor, which constitutes an approach ramp 14 for the bars. The ramp 14 is formed by a convex edge of a plate, secured by means of bolts, not shown, on the first cross-beam 4 of the frame 1. At its upper portion, the ramp 14 has a straight part 15 which is so disposed that the lower end of the guide 11 and the straight part 15 of the ramp 14 are on about the same plane. As best shown in FIGURE 2, the lower end of the guide 11 has a straight part 16 parallel to the straight part 15 of the ramp 14 and spaced from the latter by a distance 17, shown in FIGURE 2, which is equal to the sectional dimension of the bars to be counted. The guide 11 has a tapering part 18 to form a widening space in which several bars can be lodged, but it will only be possible for one bar at a time to pass into the narrow distance 17.

The front end of the shaft 8 extending outward of the bearing 7 carries a pulley 19 which through a belt 20 drives a second pulley 21 secured to the outward end of an axle 22 rotatably mounted in a bearing 23 which is in turn fixed to the post 5 below the bearing 7. At its inner end, the axle 22 carries a circular-shaped cam 24 which is rotatably carried by a housing portion of a swinging arm 25. One end 26 of the arm 25 is rotatably secured to one end of a small connecting rod 27. The other end of the connecting rod being rotatably secured at 28 in a bearing 29 that is secured to the post 5 beneath the bearing 23. By this arrangement the free end 30 of the arm 25 is between the upper-front cross-piece 6 and the first cross-beam 4 of the frame 1. In this way, as can be best appreciated from FIGURE 2, when the cam 24 is rotated, the end 26 of the arm 25, retained by the connecting rod 27, passes through a circular arc having as a center the fulcrum point 28 and as a radius, the length of the small connecting rod 27. As a result the free end 30 of the arm 25 passes through a curved trajectory, represented by the dot-and-dash line 31 in FIGURE 2, in a plane perpendicular to the axis of the shaft 8.

The bars to be separated and counted are disposed longitudinally on the frame 1, which constitutes an entry station, in a parallel relation with respect to the shaft 8 and are held in place laterally alongside the longitudinal beam 3 of the frame 1 by means of an inclined stop-plate 32 secured to the cross-beams 4 in an angular position that is similar to the position of the ramp 14, but spaced to the right of the latter as one views FIGURE 1. Referring again to FIGURE 1 there is provided on the shaft 8 a conveying system for the bars which consists of a plurality of supporting disks 33 and conveying disks 34 rigidly secured to the shaft 8 at spaced intervals, the conveying disks 34 having radially extending teeth 35 formed on their peripheries. Rigidly secured also to the shaft 8 and between two of these disks is a drive pulley 36 connected by a belt 37 to a pulley 38 of a drive 39. The description of the relevant form of the present invention can be completed by noting the bar receiving trough 40 located at the far side of the assembly. This trough, which constitutes the delivery station for the separating and counting bar, is made in the form of a V, having a length substantially equal to the length of the shaft 8.

The above-disclosed apparatus operates as follows: a plurality of bars are arranged longitudinally on the frame 1 at the entry station in a parallel relationship with the shaft 8. The shaft 8 is driven in a counterclockwise direction as one views FIGURE 1 by the drive 39 through pulleys 36 and 38 and belt 37.

The shaft 8, in turn, actuates the cam 24 through the pulley 19, the belt 20, and pulley 21 and the axle 22, and the free end 30 of the arm 25 passes through its trajectory 31, as shown in FIGURE 2, by alternatively moving towards and away from the distance 17 separating the inner end of the guide 11 and the part 15 of the ramp 14.

With each one of its displacements the end 30 of the arm 25 carries along with it the front ends of bars disposed on the frame 1, which slide angularly upward upon the convexly-shaped edge of the ramp 14, the rear ends of these bars remaining on the frame. As soon as the arm 25 starts its downward motion at the end of its trajectory 31 near the summit of the ramp 14, the bars drop into the widened space adjacent the distance 17 and pass individually one after another into the distance 17.

The teeth 10 of the disk 9 engage and convey only the one end of a bar which is held by the guide 11 to prevent it from being dislodged therefrom. As the tooth 10 continues to rotate, the bar rises and slides on the plate 32, after which it is progressively engaged by the radial teeth 35 of the disks 34, the intermediate disks 33 serving as auxiliary supports for the bars. Thus the rear end of each bar is engaged and conveyed by the teeth 35 of the last disk 34 at the far end of the shaft 8. As the tooth 10 continues to carry the bar, its front end actuates the counting device 13 and thereby is counted. As the rear end of each bar, in turn, is freed by gravity, the bars drop on the other side of the apparatus into a receiving station formed by the trough 40. After the bars are engaged between the radial teeth 35 of the disks 34, their mass tends to accelerate the rotary movement of the conveying disks 34. This tendency may be overcome by employing a gear reducer in the drive 39 to assure a constant rotary speed of the shaft 8.

The bars to be counted can be continuously arranged at the entry station on the frame 1 and in order to facilitate their placement at the bottom of the ramp 14, provision, such as plates 41 shown in FIGURE 1, may be provided on each of the cross-beams 4 of the frame 1.

These plates are arranged on their edge with their upper edge inclined from the lateral beam 2 towards the base of the stop plate 32. It will be noted that the plates 41 terminate a short distance from the base of the ramp 14 in order to form a reserve in which a plurality of bars may accumulate by gravity, corresponding approximately to the capacity of the distance 17 between the inner end 18 of the guide 11 and the straight part 15 of the ramp 14.

In addition, it may be advantageous to provide on the upper front cross-piece 6 a vertical plate, not shown, to serve as a stop for the bars or other sections to be counted, in order to prevent the bars from passing beyond the framework which might impede their passage into the distribution device.

One can now appreciate that the apparatus according to the invention operates in an extremely simple manner and, further, that the apparatus facilitates separation of bars or other rolled products under the supervision of one single operator to observe the proper distribution of the bars at the bottom of the ramp 14 and on the plates 41 of the entry station.

Preferably, the guide 11 and the ramp 14 are mounted adjustably so as to regulate the width of the distance 17 between the guide 11 and the periphery of the disk 9 as well as the width of the distance 17 between the end of the guide 11 and the top of the ramp 14 relative to the sectional dimensions of the products to be separated and counted.

The number of revolutions of the disk 9 within a given time, may be referred to as the operating speed of the apparatus, which, of course, is a function of the speed of the drive 39, as well as the number of radial teeth 10 of the disk 9. These teeth may vary in number and their number may be selected at will. For that purpose the teeth may be formed by metal bars disposed radially on the disk 9, each one of these bars having a longitudinal slot and being capable of sliding radially between two projecting rods traversing said slot, the rod closest to the center of the disk having an enlarged head to hold the bar, and the other rod having threads to receive a wing-nut to hold the bar.

Thus, one may, at will, select the number of conveying teeth 10 as a function of the desired operating speed and section dimension of the bars or other products to be separated and counted.

In another variation, not shown in the drawings, the horizontal shaft 8 is comprised of two or more sections, each of these sections being rotated at a gradually increasing rate of speed by means of a shaft emerging from the drive through pulleys of appropriate diameters. In this manner the final shaft portion, back of the framework, turns at a higher rate of speed than that of the disk 9. In this manner, the rear portion of the bar will have caught up with the front end of the bar being conveyed at a slower rate by the disk 9 of the distributing device. This will not only avoid torsion of the bars being counted but also provide that the bars will drop horizontally into the receiving trough 40.

According to a preferred variation, as shown in FIGURE 3, the shaft 8 is constructed in two parts, 8a and 8b, which are interconnected by a member 42, such as a clutch, and driven separately by the drives 39 and 39a. By this arrangement, the distributing device can be stopped alone, after a certain number of bars have been counted, while the disks 33 and 34 continue to turn to complete separation of the last bar from those remaining on the frame 1.

The invention, of course, is not limited to the embodiments represented and described, which have been selected only by way of example, as numerous modifications can be applied without thereby passing beyond the scope of the invention.

I claim:

1. An apparatus for separating and counting elongated workpieces comprising:

an entry station for receiving a number of workpieces arranged in a generally parallel relationship, a delivery station for receiving workpieces transferred from said entry station after they have been separated and counted, a shaft arranged intermediate said entry and delivery stations and in a generally parallel relationship with respect to workpieces received by said entry station, means for supporting said shaft, a rotary distributing means carried by said shaft for transferring one end of at least a single workpiece from said entry station to said delivery station, said distributing means including a carrier member for carrying one end of at least a single workpiece, means for rotating said distributing means in the direction of said delivery station, means for counting a workpiece while it is being carried by said carrier member, a feed means having a workpiece engaging end for transferring one end of at least a single workpiece from said entry station to said rotary distributing means, and means for moving said feed means to effect a transfer of a workpiece.

2. An apparatus according to claim 1 wherein:

said rotary distributing means includes a generally circular disk, said carrier member comprising at least one tooth extending radially from said disk, a concave-shaped guide at least partially surrounding said disk and spaced therefrom for passage of a workpiece therebetween, an approach ramp arranged intermediate said entry station and said distributing means and at a spaced, predetermined distance from said guide to form a restricting passageway for workpieces passing to said distributing means.

3. An apparatus according to claim 1 comprising:

at least one conveying disk carried by said shaft and axially spaced from said distributing means, said conveying disk being drivenly interconnected with said distributing means, at least one tooth extending radially from the periphery of said disk to assist said distributing means in transferring a workpiece.

4. An apparatus according to claim 3 comprising:

at least one support disk carried by said shaft and spaced axially from said distributing means and said conveying disk.

5. An apparatus according to claim 3 wherein:

said shaft is comprised of first and second sections, said distributing means carried by said first section of said shaft and said conveying disk carried by said second section of said shaft, means for rotating said conveying disk independently of rotation of said distributing means.

6. An apparatus according to claim 3 further comprising:

means adjacent to said conveying disk for preventing engagement of a workpiece therewith until the workpiece has been first engaged and rotated by said distributing means.

No references cited.

LEO SMILOW, *Primary Examiner.*